United States Patent
Han et al.

(10) Patent No.: US 6,367,146 B1
(45) Date of Patent: Apr. 9, 2002

(54) PHOTORESIST FRAME PLATING METHOD FOR FORMING PLANARIZED MAGNETIC POLE LAYER

(75) Inventors: Cherng-Chyi Han; David Hernandez, both of San Jose; Jei-Wei Chang, Cupertino; Shou-Chen Kao, Fremont, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 08/635,097

(22) Filed: Apr. 17, 1996

(51) Int. Cl.[7] .............................................. G11B 5/127
(52) U.S. Cl. .................................................. 29/603.15
(58) Field of Search .......................... 29/603.15, 603.13, 29/603.14; 360/113

(56) References Cited

U.S. PATENT DOCUMENTS

| | | | | |
|---|---|---|---|---|
| 3,860,965 A | | 1/1975 | Voegell ...................... 360/113 |
| 4,943,882 A | * | 7/1990 | Wada et al. .............. 29/603.15 |
| 5,068,959 A | * | 12/1991 | Sidman .................... 29/603.15 |
| 5,230,833 A | | 7/1993 | Romberger et al. ...... 252/363.5 |
| 5,571,373 A | | 11/1996 | Krishna et al. .......... 156/636.1 |
| 5,575,837 A | | 11/1996 | Kodama et al. ................ 106/3 |

OTHER PUBLICATIONS

Y. Hsu, et al. "Dual–Stripe MR Heads for One Gigabit per Inch Square Recording Density" Apr. 18, 1995.

Ali, et al., "Charged Partiles in Process Liquids", Semiconductor International, Apr. 1990, pp. 92–95.

Carpio, R. et al "Initial Study on Copper CMP Slurry Chemistries" Thin Solid Film 1995, pp. 238–244.

Sabde, G.M. Slurry Development For Chemical Mechanical Polishing of Tungsten, CMP–MIC Conference, 1997, pp. 331–334.

Pohl, M., et al., "The Importance of Particle Size to the Performance of Abrasive Particles in the CMP Process", Journal of Electronic Materials, vol. 25, Nov. 10, 1996, pp. 1612–1616.

Vander Voort, G.F., "Polishing With Colloidal Silica", 1997, pp. 1–13.

Ali, I., et al., "Chemical–Mechanical Polishing of Interlayer Dielectric: A review", Solid–State Technology Oct. 1994, pp. 63–70.

Niernynck, J.M., et al., The Addition of Surfactant to Slurry for Polymer CMP: Effects on Polymer Surface, Removal Rate and Underlying Cu, Thin Solid Films, 1996 pp. 447–452.

Hu, Z. Y. et al. "Chemical–Mechanical Polishing of PECVD Silicon Nitride" Thin Solid Films, 1996, pp. 453–457.

Thomas C. Anthony, et al., "Dual Stripe Magnetoresistive Heads for High Density Recording", IEEE Transactions on Magnetics, Mar. 1994, vol. 30, No. 2, pp. 303–308.

K. Skidmore, "Techniques for Planarizing Device Topography", Semiconductor International, Apr. 1988, pp. 115–119.

* cited by examiner

Primary Examiner—Carl E. Hall
(74) Attorney, Agent, or Firm—George O Saile; Stephen B. Ackerman; Alek P. Szecsy

(57) ABSTRACT

A method comprises the step of providing a read-write element on a wafer including at least one magnetoresistive stripe, providing a shared pole layer above the magnetoresistive stripe, and planarizing the shared pole layer. Thereafter, a top pole layer is formed above the shared pole layer. Together, the shared and top pole layers form the write element. Because the shared pole layer is planarized, the gap portion of the write element between the shared and top pole layers is flat. Because of this, improved recording density can be achieved.

18 Claims, 22 Drawing Sheets

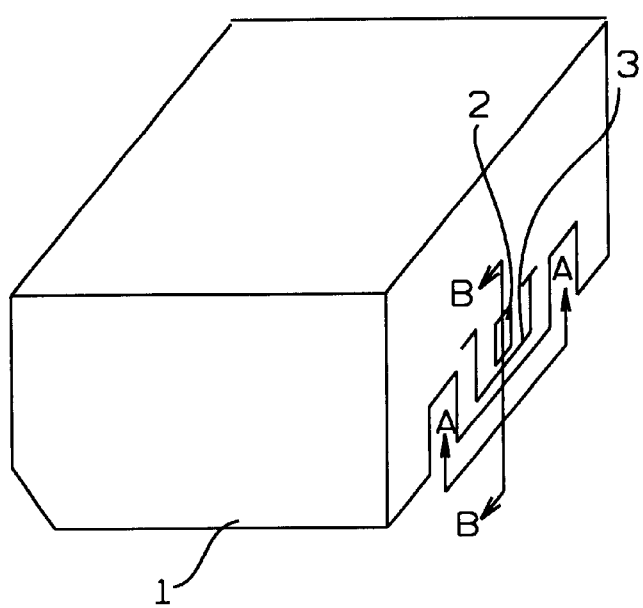
FIG. 1 – Prior Art

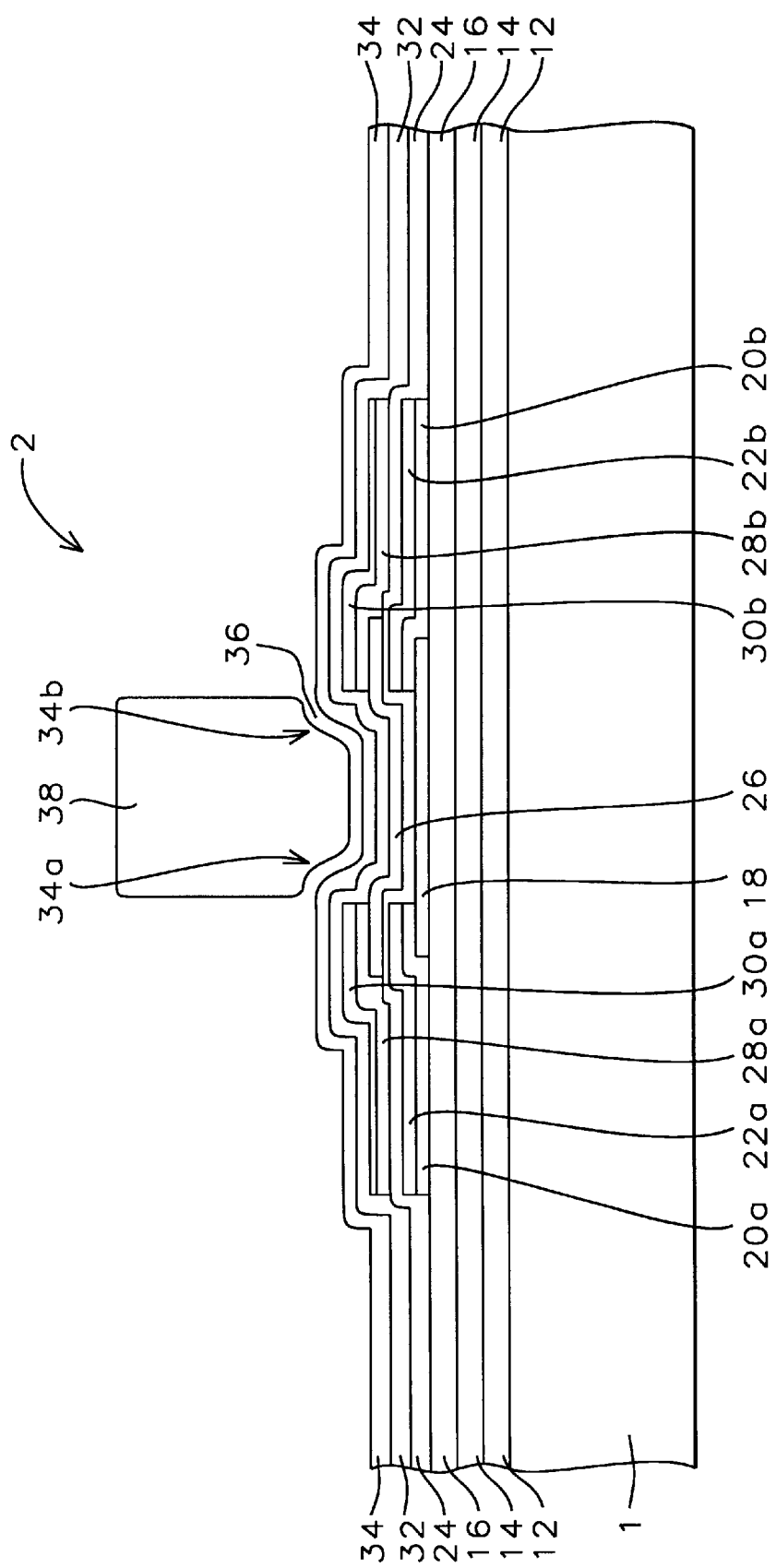
FIG. 2a – Prior Art

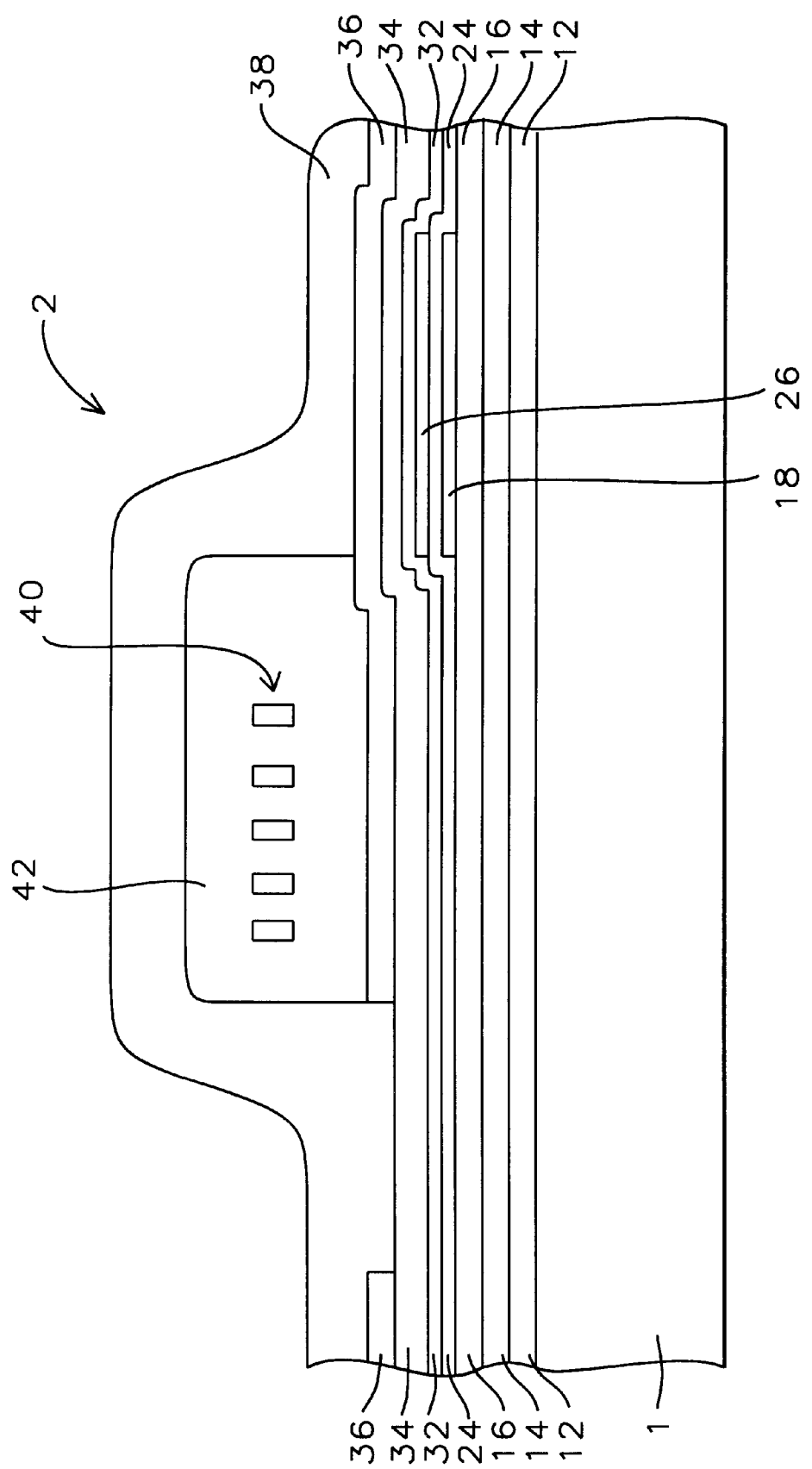
FIG. 2b – Prior Art

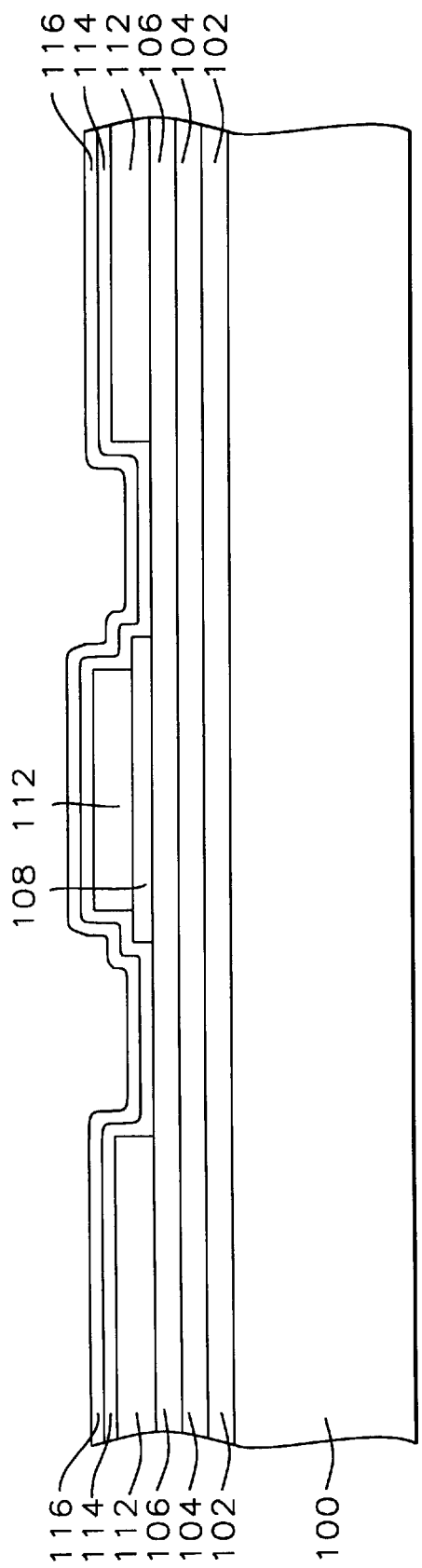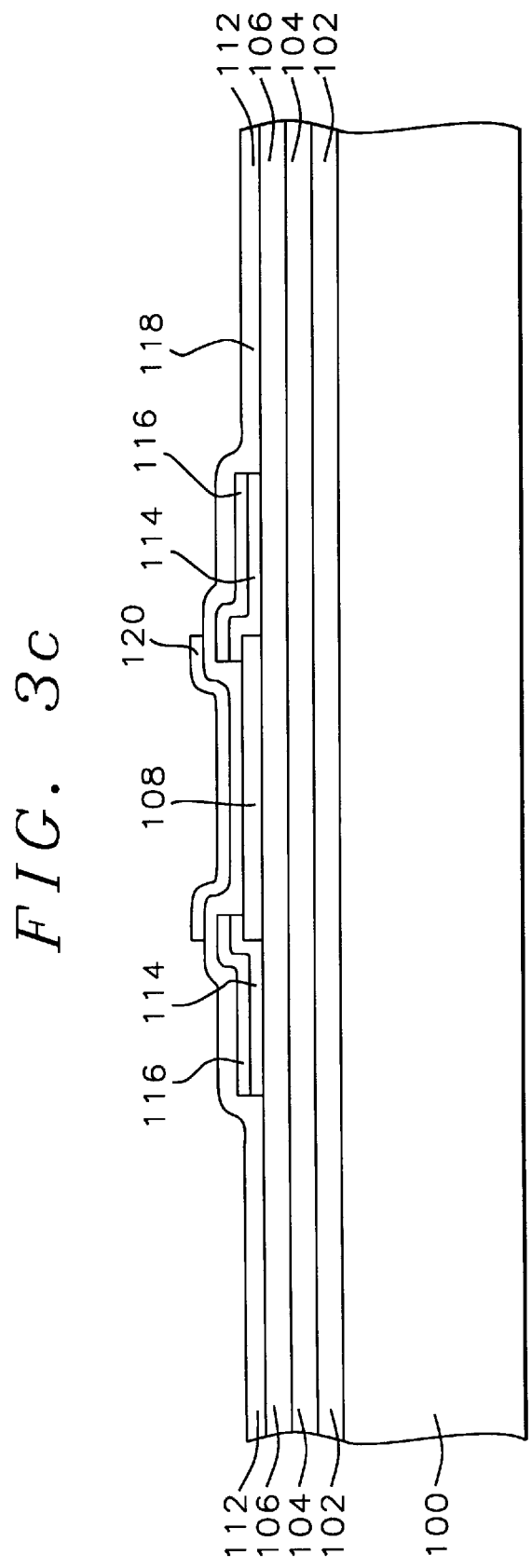

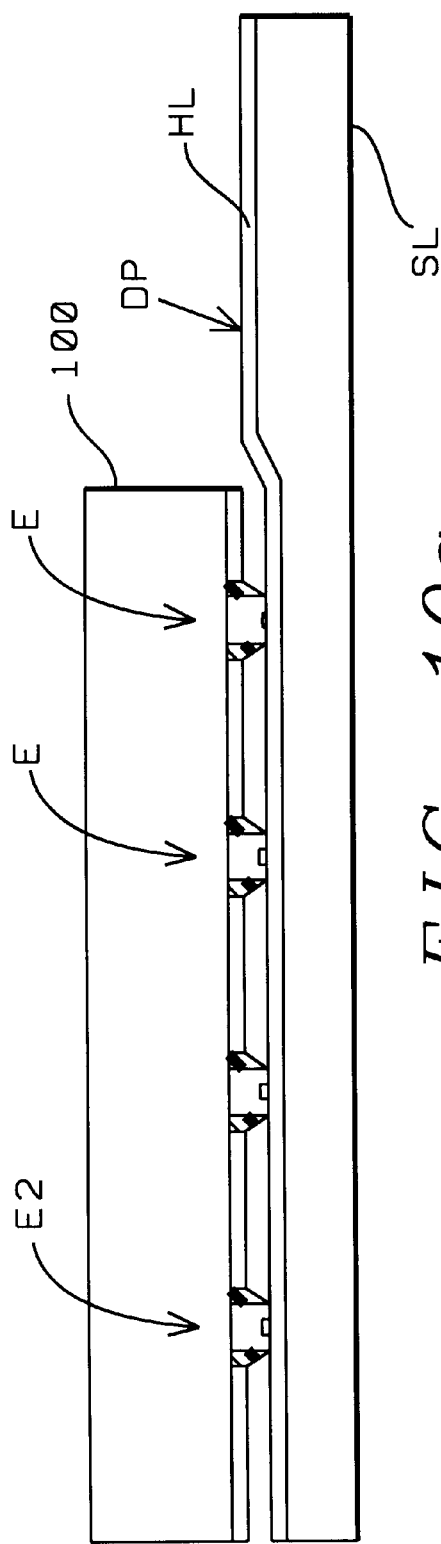
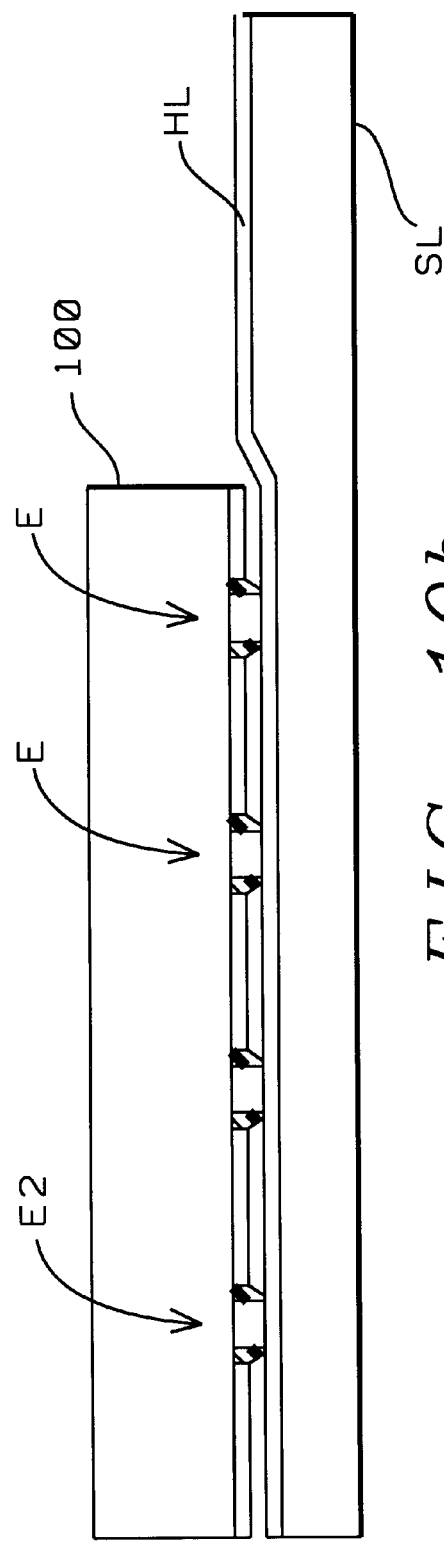
FIG. 10a
FIG. 10b

PHOTORESIST FRAME PLATING METHOD FOR FORMING PLANARIZED MAGNETIC POLE LAYER

FIELD OF THE INVENTION

This invention relates to magnetoresistive heads used in magnetic recording.

BACKGROUND OF THE INVENTION

Dual-stripe magnetoresistive ("DSMR") read-write heads are known in the art to have a number of advantages such as facilitating improved areal recording density. FIG. 1 illustrates a read-write head comprising a slider 1 and a read-write element 2 mounted on the trailing side of a center rail 3 of slider 1. Read-write element 2 is used to read data from and write data to a magnetic disk during use.

FIG. 2a illustrates in cross section read-write element 2 along lines A—A. FIG. 2b illustrates in cross section read-write element 2 along lines B—B.

Referring to FIG. 2a, read-write element 2 is formed on slider 1, which is formed from $Al_2O_3$—TiC. An $Al_2O_3$ insulating layer 12, a bottom pole layer 14 (typically a NiFe alloy), an $Al_2O_3$ insulating layer 16, a first magnetoresistive stripe 18 (typically a NiFe alloy), a first pair of exchange layers 20a, 20b and a first pair of contact layers 22a, 22b are formed on the slider material. Contact layers 22a, 22b are used to electrically contact magnetoresistive stripe 18. Exchange layers 20a, 20b are used to stabilize the domains of MR stripe 18.

An $Al_2O_3$ insulating layer 24 is formed on contact layers 22a, 22b. A second magnetoresistive stripe 26, a second pair of exchange layers 28a, 28b and a second pair of contact layers 30a, 30b are formed on $Al_2O_3$ insulating layer 24. Contact layers 30a and 30b are for electrically contacting magnetoresistive stripe 26. Exchange layers 28a and 28b stabilize the domains of MR stripe 26.

Magnetoresistive stripes 18 and 26 are used to read data from a magnetic disk in a manner well-known in the art. See, for example, U.S. Pat. No. 3,860,965, incorporated herein by reference. An insulating layer 32 (typically $Al_2O_3$) is formed on contact layers 30a, 30b and a shared pole layer 34 (typically formed from a NiFe alloy) is formed on $Al_2O_3$ insulating layer 32. Of importance, bottom pole layer 14 and shared pole layer 32 (also known as first and second shield layers, respectively) filter the magnetic field from the magnetic disk. In this way, the magnetic field from data tracks adjacent to a track being read will not interfere with magnetoresistive stripes 18 and 26.

A gap insulating layer 36 (typically $Al_2O_3$) is formed on shared pole layer 32. Formed above gap insulating layer 36 is a top pole layer 38. Shared pole layer 32 and top pole layer 38 serve as magnetic poles during writing operations.

FIG. 2b illustrates read-write element 2 in cross section along arrows B—B. As can be seen, top pole 38 extends upwardly and over a copper coil structure 40 that is used to generate a magnetic field during writing. Coil structure 40 is electrically insulated from top and shared pole layers 38, 34 by insulating material 42.

Referring back to FIG. 2a, because of the uneven shape of the top surface of shared pole layer 34, the gap between the top and shared pole layers 38, 34 is curved, bending at points 3a and 34b. The shape of magnetic bits recorded in a magnetic disk by read-write head 2 is affected by the shape of the gap between top and shared pole layers 38, 34. In particular, since this gap is curved, the shape of the bits recorded in a disk therewith is curved. This curvature reduces the recording density that can be achieved. It is an object of our invention to eliminate this curvature. Eliminating the curvature in the gap permits us to increase recording density.

SUMMARY OF THE INVENTION

A method in accordance with our invention includes the steps of forming magnetoresistive stripes on a substrate, forming a shared pole layer above the magnetoresistive stripes, forming a gap layer above the shared pole layer, and forming a write pole layer above the gap layer. In accordance with one novel feature of our invention, the top surface of the shared pole layer is planarized prior to forming the gap layer. Accordingly, our invention has the effect of eliminating or substantially reducing curvature in the gap layer. Eliminating this curvature permits us to increase recording density. In one embodiment, planarization is accomplished by a mechanical-chemical planarization technique. In another embodiment, planarization is accomplished with an etch-back technique.

In one embodiment, at the conclusion of the planarization process, the roughness Ra of the shared pole layer is less than 0.1 microns, and typically less than 0.05 microns.

BRIEF DESCRIPTION OF THE DRAWINGS

FIG. 1 illustrates a read-write head constructed in accordance with the prior art.

FIG. 2a illustrates in cross section a read-write element mounted on the read-write head of FIG. 1 taken along arrows A—A.

FIG. 2b illustrates in cross section the read-write element along arrows B—B.

FIGS. 3a to 3j illustrate a read-write element during a manufacturing process in accordance with our invention along the same direction as indicated by arrows A—A in FIG. 1.

FIGS. 10a and 10b schematically show a wafer containing partially formed read-write elements at the start and completion of planarization with a double pad having hard and soft layers.

DETAILED DESCRIPTION

Embodiment 1

Figure 3A:
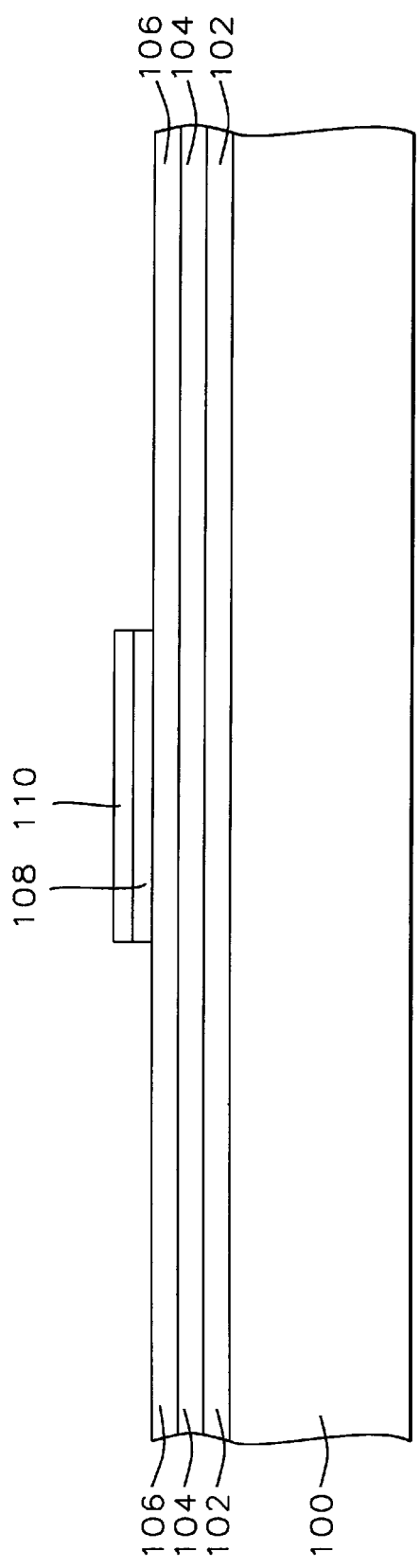

A method in accordance with one embodiment of our invention begins with the step of forming an insulating layer 102 on a substrate 100 (see FIG. 3a). In one embodiment of our invention, substrate 100 is an $Al_2O_3$—TiC wafer and insulating layer 102 is an $Al_2O_3$ layer formed by sputtering to a thickness of about 10 microns. However, other materials can be used in lieu of $Al_2O_3$ as the insulating layer or $Al_2O_3$—TiC as the wafer. Substrate 100 may be in the shape of a square wafer wherein each edge of the square is typically 4.5 inches long and about 1.4 to 2 mm thick. However, other sizes and shapes for substrate 100 can also be used.

Thereafter, a bottom pole layer 104 (also known as a "first shield layer") is formed on the wafer, e.g. by sputtering to a thickness of about 2 microns. In one embodiment, bottom pole layer 104 is a NiFe alloy that serves to shield subsequently formed magnetoresistive stripes from the magnetic field from adjacent data tracks. In one embodiment, bottom pole layer 104 is 81% Ni and 19% Fe. However, alloys such as sendust or other amorphous alloys can be used. It is generally desirable that the magnetic anistropy of the alloy be below 10 or 20 Oe, the magnetic permeability be between about 500 to 2000, the coercivity be below about 1 Oe, and the pole layer be sufficiently mechanically strong so that it can withstand a subsequent mechanical chemical planarizing step described below.

Thereafter, a second insulating layer (e.g. $Al_2O_3$ layer 106) is formed on the wafer surface, e.g. by sputtering, to a thickness of 500 to 900 Å.

A NiFe magnetoresistive alloy layer 108 is then deposited on the wafer, e.g. by sputtering, to a thickness of about 150 to 250 Å. In one embodiment, layer 108 is 81% Ni, 19% Fe. Magnetoresistive layer 108 is then patterned, e.g. by covering the wafer with photoresist 110, patterning photoresist 110 to expose portions of the magnetoresistive material, and etching the exposed magnetoresistive material (e.g. by ion beam etching), thereby leaving magnetoresistive stripe 108 as shown in FIG. 3a. Magnetoresistive stripe 108 forms a magnetoresistive element used to read data from a magnetic disk.

Figure 3B:
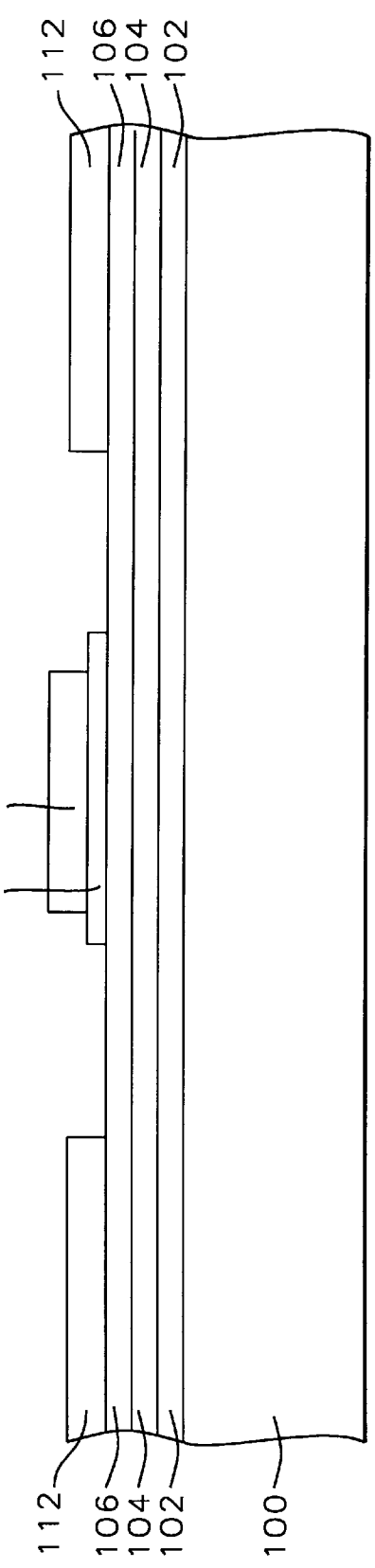

Thereafter, photoresist layer 110 is removed. A "lift-off stencil" photoresist layer 112 is then deposited on the wafer and patterned to define subsequently deposited exchange and conductor layers. The wafer at the conclusion of this process step is illustrated in FIG. 3b.

Thereafter, a first exchange layer 114 and a first conductor layer 116 are deposited on the wafer. In one embodiment, first exchange layer 114 comprises a first NiFe sublayer, (e.g. 81% Ni, 19% Fe), a MnNi sublayer (approximately 40 to 60% Ni, the remainder Mn) and a Ta sublayer deposited by sputtering in that order. The NiFe, MnNi and Ta are typically 70 Å, 200 Å and 100 Å thick, respectively. Exchange layer 114 is formed to provide longitudinal bias to stabilize domains for the magnetoresistive strip 108. Conductor layer 116 comprises a Ta sublayer, a Au sublayer, and a Ta sublayer deposited by sputtering on exchange layer 114 in that order, to thicknesses of 50 Å, 500 Å and 100 Å, respectively. Thereafter, lift-off stencil photoresist layer 112 is removed, e.g. by conventional photoresist stripping solution.

Referring to FIG. 3d, an insulating layer, such as $Al_2O_3$ layer 118 is deposited, e.g. by sputtering, followed by a second magnetoresistive layer (typically NiFe, having a composition of 81% Ni, 19% Fe and a thickness of about 150 to 250 Å, also formed by sputtering). Thereafter, the second magnetoresistive layer is patterned to form a magnetoresistive stripe 120, e.g. by photolithographic patterning. Magnetoresistive stripes 108 and 120 are used to read data from a magnetic disk during use.

Figure 3E:
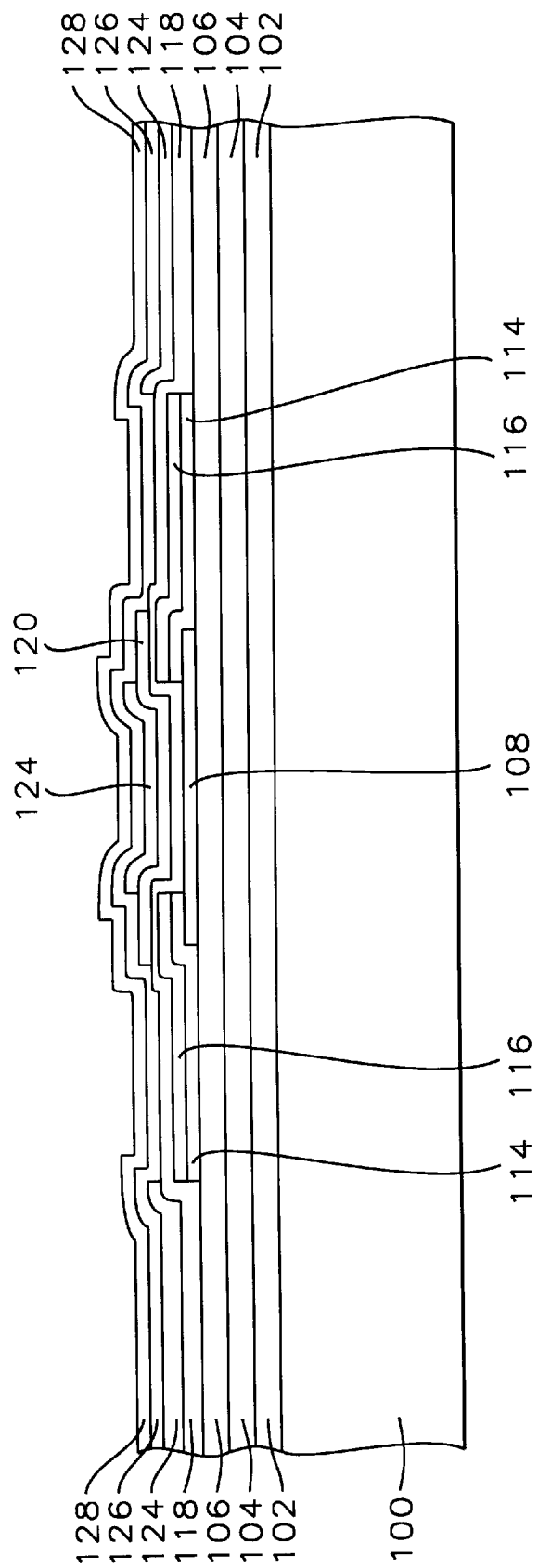

Referring to FIG. 3e, a second "lift-off stencil" photoresist layer 124 is formed on the wafer and then patterned to define a second exchange layer and conductor layer. Thereafter second exchange layer 126 and second contact layer 128 are deposited on the wafer, e.g. by sputtering. In one embodiment, the first exchange layer comprises NiFe, MnNi and Ta sublayers, formed by sputtering in that order. Also in one embodiment, second contact layer 128 comprises Ta, Au and Ta sublayers formed by sputtering in that order. The thicknesses and compositions of the second exchange and contact layers are typically the same as those of the first exchange and contact layers. Lift-off stencil photoresist layer 124 is then removed in the same manner as photoresist layer 112.

Figure 3F:
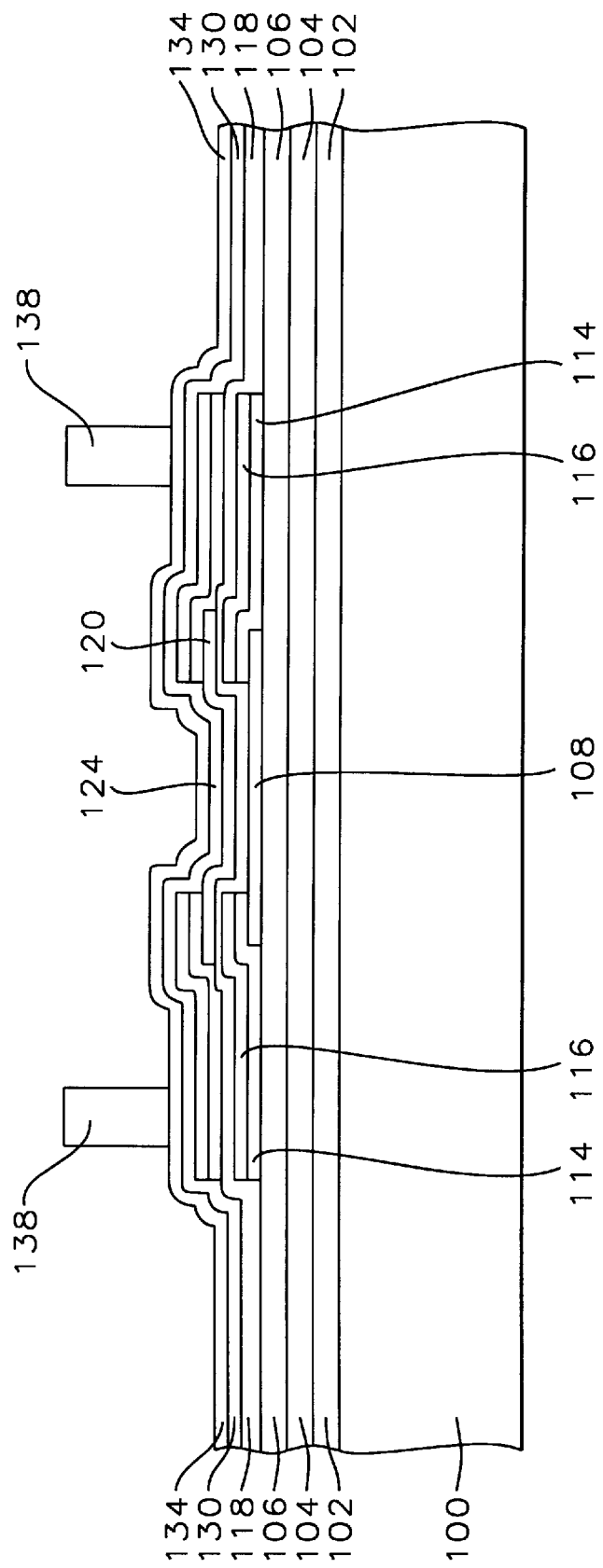

Referring to FIG. 3f, an insulating layer such as sputtered $Al_2O_3$ layer 130 is formed on the wafer to a thickness of 500 to 900 Å. Thereafter, a thin NiFe "seed layer" 134 is sputtered onto the wafer (again, about 81% Ni, 19% Fe) to a thickness of about 700 to 1000 Å. Seed layer 134 is formed to facilitate a subsequent electroplating process.

The wafer is then covered with a photoresist layer 138 which is patterned and etched as shown in FIG. 3f. Photoresist 138 defines a subsequently deposited shared pole layer.

Figure 3G:
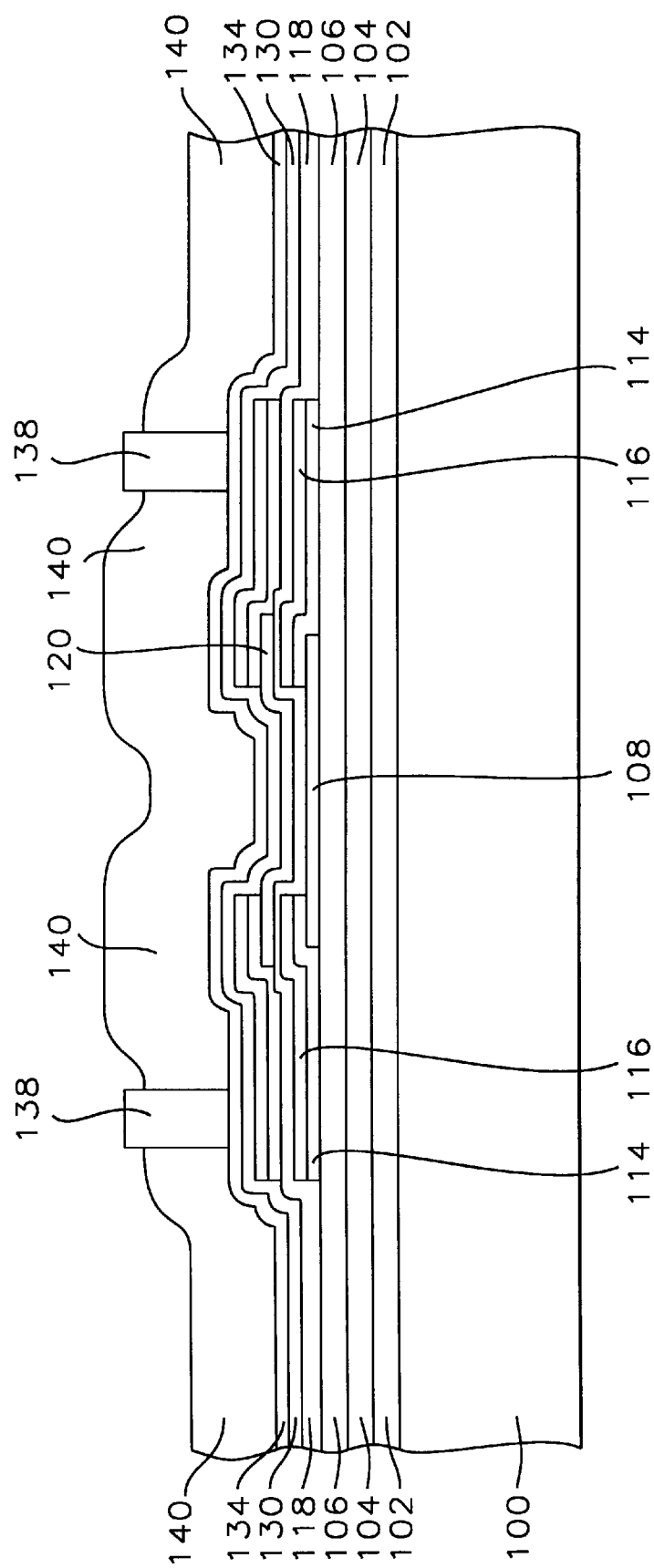

Referring to FIG. 3g, the wafer is subjected to a NiFe electroplating process to form shared pole layer 140. Of importance, shared pole layer material is only deposited on those portions of the wafer where photoresist layer 138 is absent (i.e. where seed layer 134 is exposed). Shared pole layer 140 may be 81% Ni, 19% Fe, and about 3.5 to 4.0 microns thick.

Figure 3H:
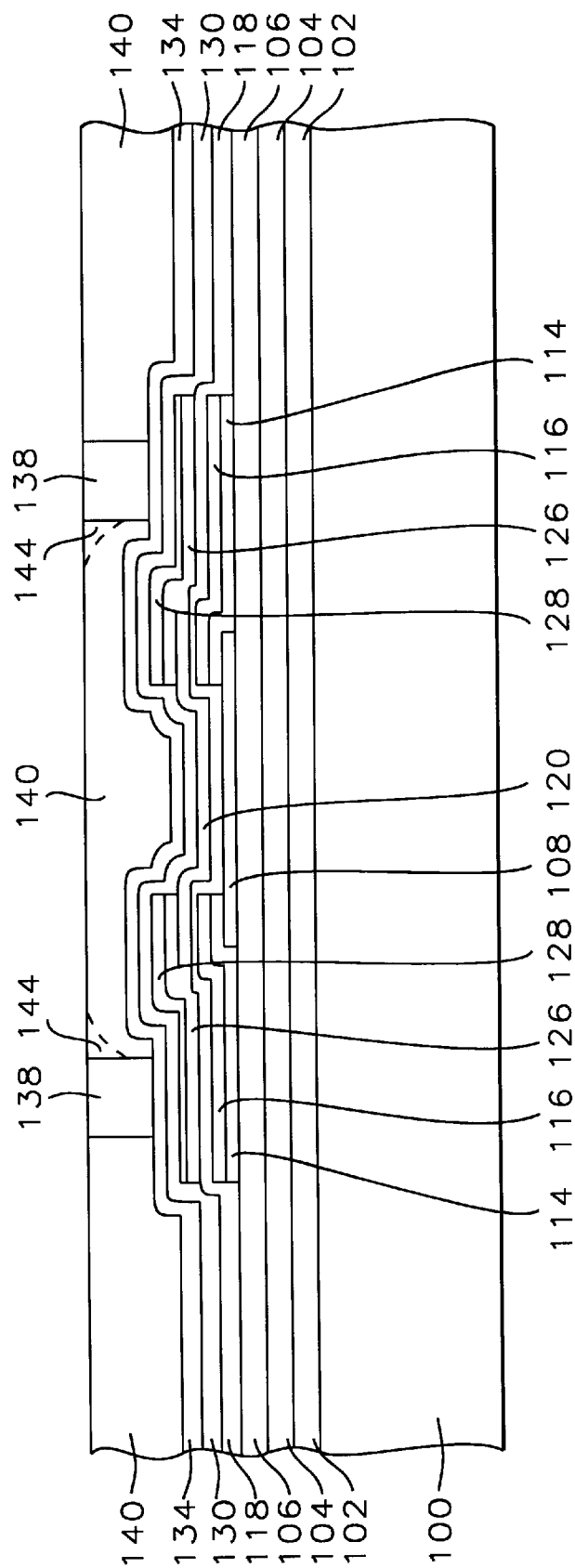

In accordance with one novel feature of our invention, the wafer is then subjected to a planarizing step to planarize the wafer, thereby resulting in the structure shown in FIG. 3h. This process step is significant because a gap layer and a top pole layer are subsequently formed on top of shared pole layer 140. If the top of shared pole layer 140 is not planar, the gap in the write element will not be planar, and this will detrimentally affect the recording density that can be achieved with the read-write element.

In one embodiment of our invention, the planarizing step is performed using a mechanical-chemical planarizing process. This can be accomplished using a planarizing machine such as device model no. 6DSP manufactured by Strasbough Corporation of San Luis Obispo, Calif. This process may be performed using a polyurethane "double pad" such as pad number Q1400 manufactured by Rodel Corporation of Scottsdale, Ariz. This pad includes two layers of polyurethane, a first layer being between about 0.01 to 0.1 inches, and typically about 0.05 inches thick and having a compressibility of about 0.5 to 6%, formed on a second layer that is between about 0.01 to 0.25 inches, and typically about 0.05 inches thick and having a compressibility of about 4 to 27%. During planarization, the harder layer (lower compressibility) contacts the wafer. The double pad is available having perforations formed therein. These perforations prevent the wafer from sticking to the pad.

Figure 4:
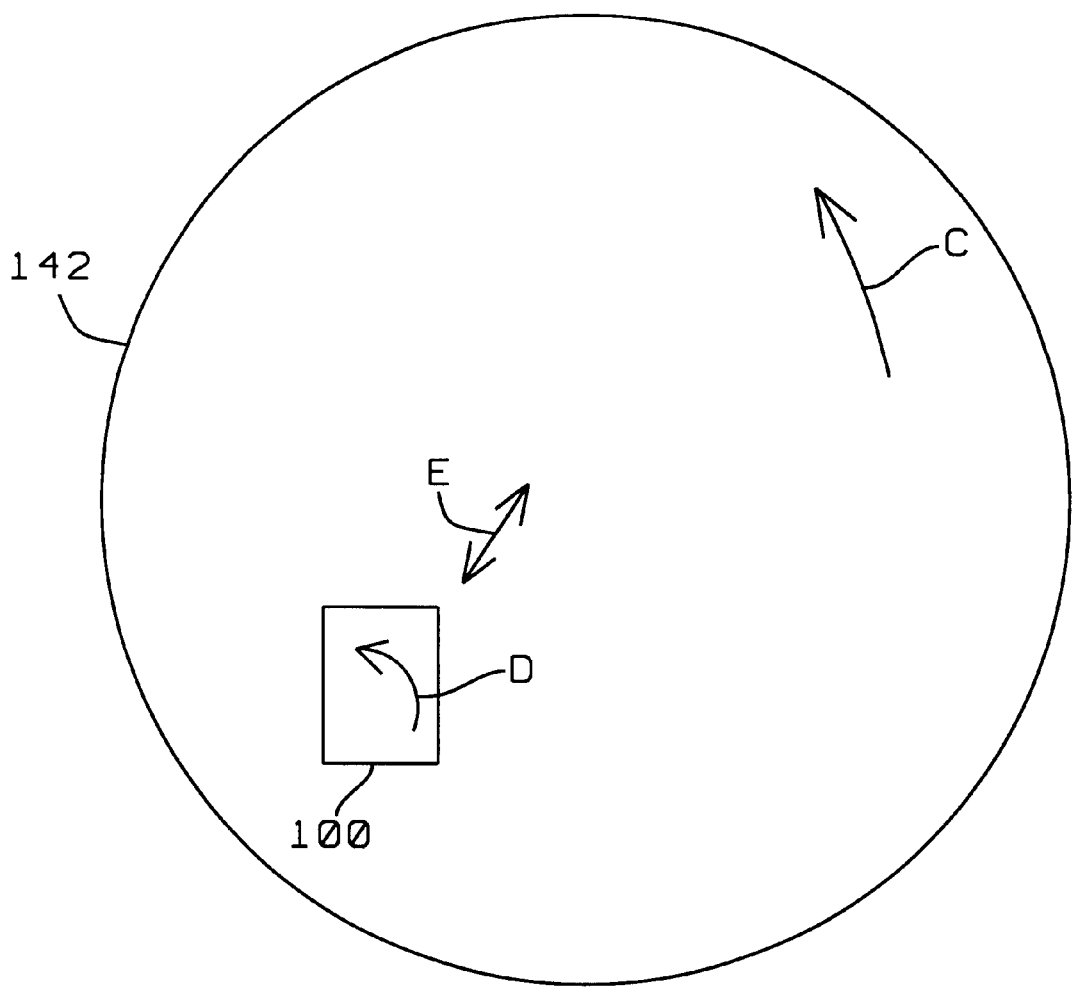
FIG. 4 shows the manner in which a wafer is moved against a pad during a mechanical chemical planarizing step.

A slurry such as sold under product number BC0033 by Universal Photonics, Inc. of Hicksville, N.Y. is used in conjunction with the double pad and the Strasbough planarizing machine. The slurry comprises an alkali solution such as KOH and water, having a pH between about 9 and 11. The slurry solution includes colloidal silica particles having a size of about 0.05 microns. The slurry flow rate is 150 ml/minute. During this process, the wafer is pushed against the double pad (labelled 142 in FIG. 4) at a downward force of about 8 pounds while the pad is rotating at approximating 35 rpm in the direction of arrow C and the wafer is rotating at about 15 rpm in the direction of arrow D. Pad 142 has a diameter of about 28 inches. While wafer 100 and pad 142 are rotating, wafer 100 is moved back and forth in the direction of arrow E. The planarization process takes approximately 5 minutes. The devices on the wafer at the conclusion of the process have a planar surface, e.g. as illustrated in FIG. 3h, and an average thickness of about 3.0 microns. After planarizing a wafer, in one embodiment, one "conditions" pad 142 by rubbing a diamond puck against pad 142 before planarizing another wafer. The diamond puck may be part no. 217861, available from Strasbough. While conditioning the pad, the diamond puck is pushed against the pad at a pressure of about 10 lbs, and the puck is rubbed against the pad while the puck is rotating at 20 rpm, the pad is rotating at 35 rpm, and the puck sweeps over a path extending from a point 4 inches from the pad center to 11 inches from the pad center approximately 20 times.

Although one embodiment of our invention uses KOH, other embodiments use other alkali solutions such as a NaOH solution. NaOH, KOH and other alkali materials have the property that they prevent the slurry solution from becoming acidic and then chemically etching shared pole layer 140. These materials also have the advantage of forming a passivating oxide layer on the top surface of shared pole layer 140, thereby preventing subsequent corrosion. However, other chemicals having these properties could also be used.

Also, although one embodiment of our invention uses silica slurry particles, other particles such as alumina or diamond can also be used. These particles should preferably be sufficiently hard to grind shared pole layer 140 at an appropriate rate.

Although in one embodiment, the above-mentioned Strasbough planarizing machine, Rodel pad and Universal Photonics slurry are used, our invention is not limited to this equipment and materials. Rather, this equipment and materials are merely exemplary. Similarly, our invention is not limited to the specific operation parameters set forth above. Rather, other planarizing techniques may be used, e.g. as discussed below.

The presence of photoresist 138 during planarizing has a particularly beneficial advantage in our process. If photoresist 138 were not present during planarizing, the corners of shared pole layer 140 would be rounded (see dotted line 144 in FIG. 3h). By providing photoresist 138, this rounding of the corner of shared pole layer 140 does not occur. This has the advantage of preventing excessive thinning of shared pole layer 140, and preventing layer 140 from accomplishing its function. Photoresist 138 has a second beneficial effect of helping to prevent contaminant particles from lodging on the wafer surface during planarization. Finally, photoresist 138 protects various test structures elsewhere on the wafer (not shown) during planarization.

Figure 6C:
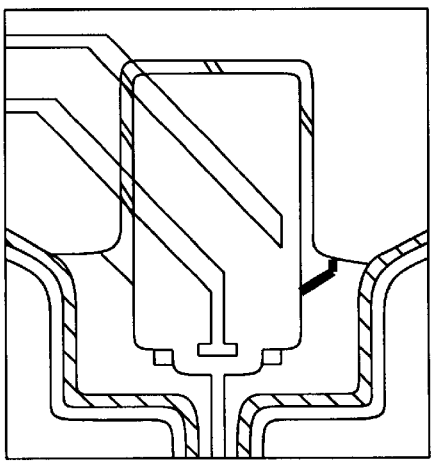
FIGS. 6a to 6d are photomicrographs of four partially formed read-write elements at various locations on a single wafer after planarizing using a hard pad.
Figure 6D:
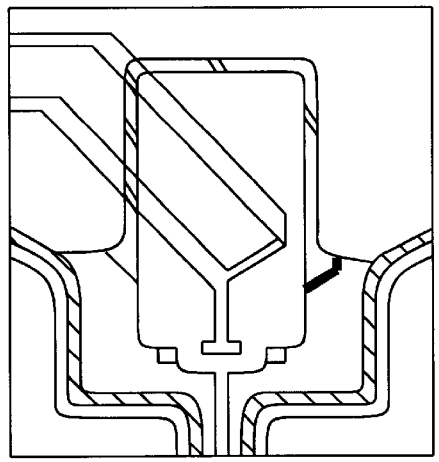
Figure 6A:
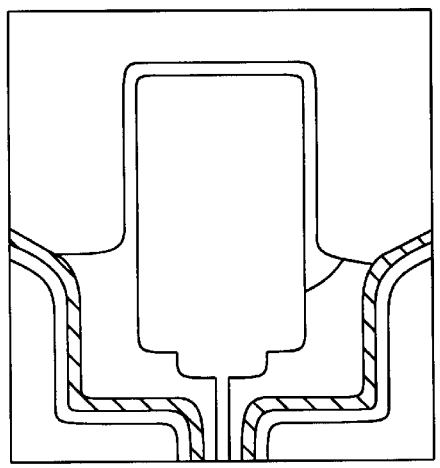
Figure 6B:
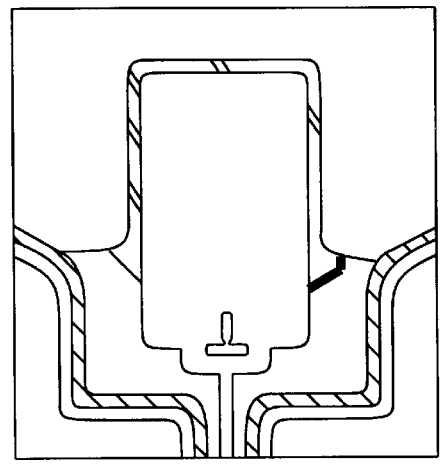

The use of a double pad also has important advantages. If a single, relatively hard pad is used, too much shared pole material is removed on certain portions of the wafer, and not enough shared pole material is removed on other portions of the wafer. Thus, on some parts of the wafer, the planarization process is not carried through to completion and/or on other parts of the wafer, the shared pole material is thinned too severely. This can be seen in FIGS. 6a to 6d, which are photomicrographs of four portions of a single wafer after planarization with a hard pad. As can be seen, FIG. 6a is properly planarized, but in FIGS. 6c and 6d, not enough material from layer 140 was taken off, and one can see the profile of various layers underneath layer 140. Thus, certain portions of the wafer were not properly planarized.

Figure 7:
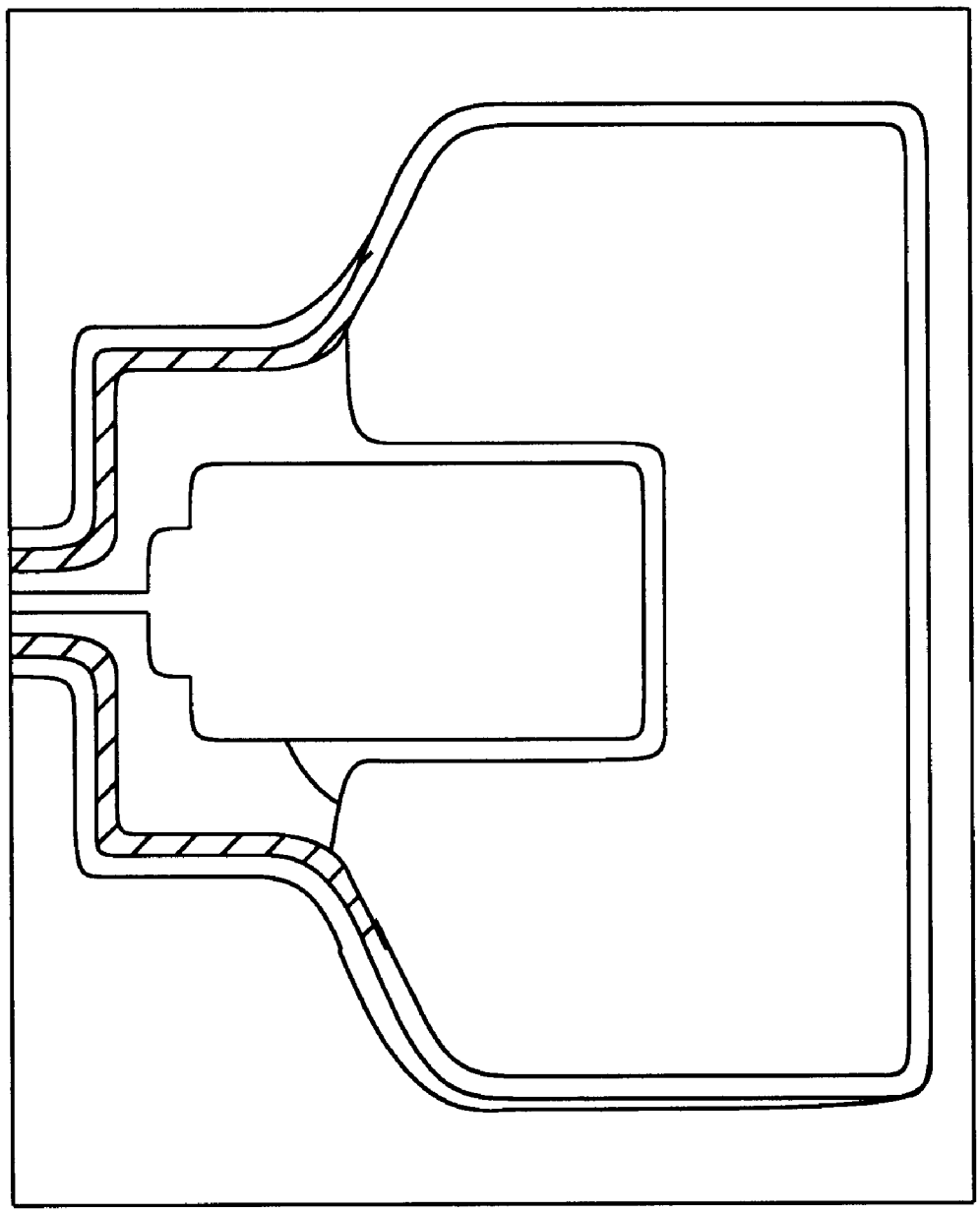
FIG. 7 is a photomicrograph of a partially formed read-write element after planarizing using a soft pad.

In FIG. 7, a single soft pad was used to planarize the wafer, thus resulting in rounding of the corners of layer 140.

Figure 8:
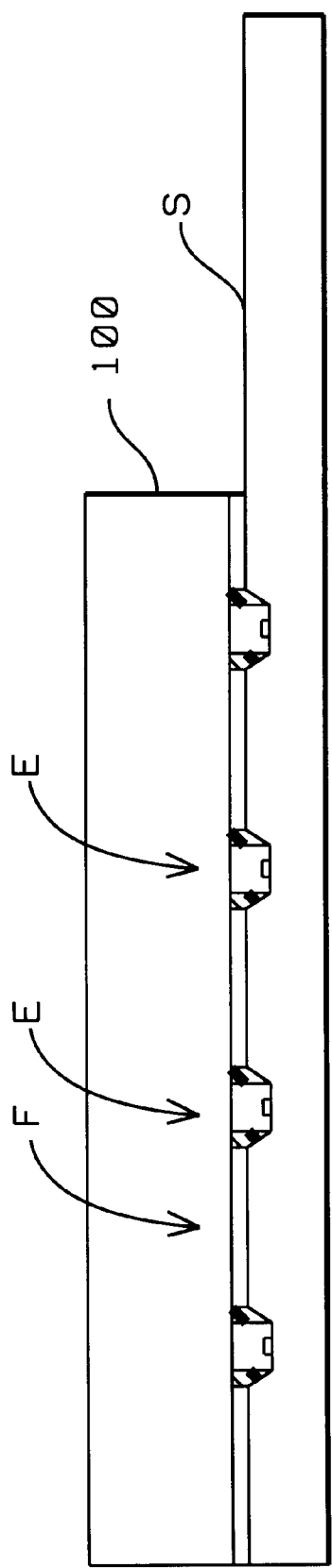
FIG. 8 schematically illustrates a wafer containing partially formed read-write elements during planarization with a soft pad.

FIGS. 8, 9, 10a and 10b schematically illustrate why a double pad provides improved results. In FIG. 8, the various partially formed read-write elements on wafer 100 are labelled E, separated by field regions F. A soft pad S is used to planarize the wafer. As can be seen, elements E sink excessively into soft pad S, thereby tending to round the edges of elements E.

Figure 9:
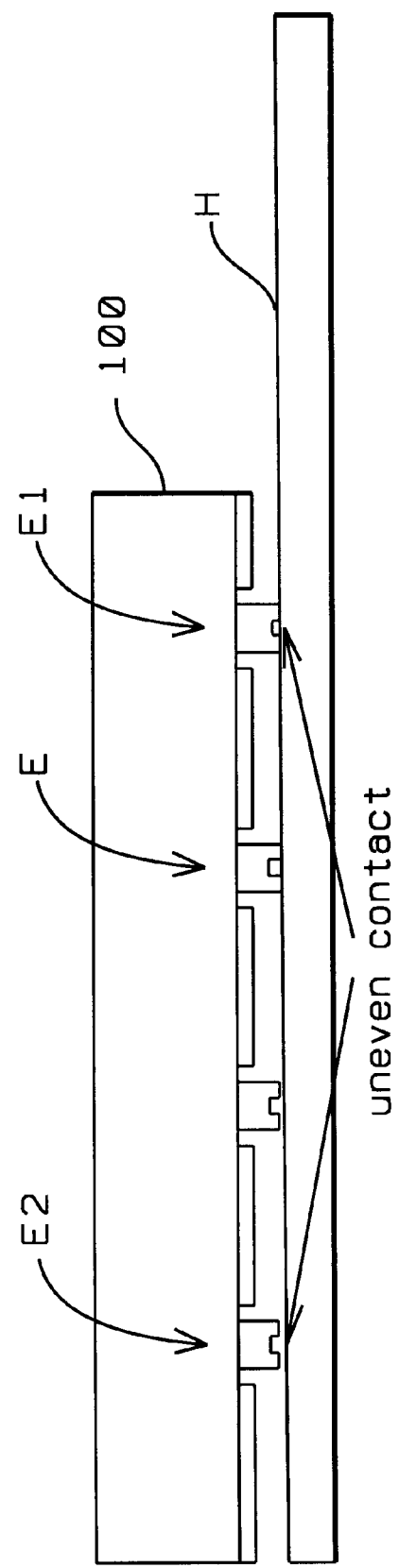
FIG. 9 schematically illustrates a wafer containing partially formed read-write elements during planarization with a hard pad.

In FIG. 9, a hard pad H is used for planarization. If wafer 100 does not have an extremely flat surface, or if hard pad H is not absolutely parallel to wafer 100, certain elements (e.g. element E1) are properly planarized, but other elements (e.g. element E2) are not.

In FIG. 10a, a double pad DP is used, having a hard layer HL and a soft layer SL. As can be seen, FIG. 10a and 10b show planarization at the beginning and end of the process. As can be seen, a double pad provides superior results.

Figure 11:
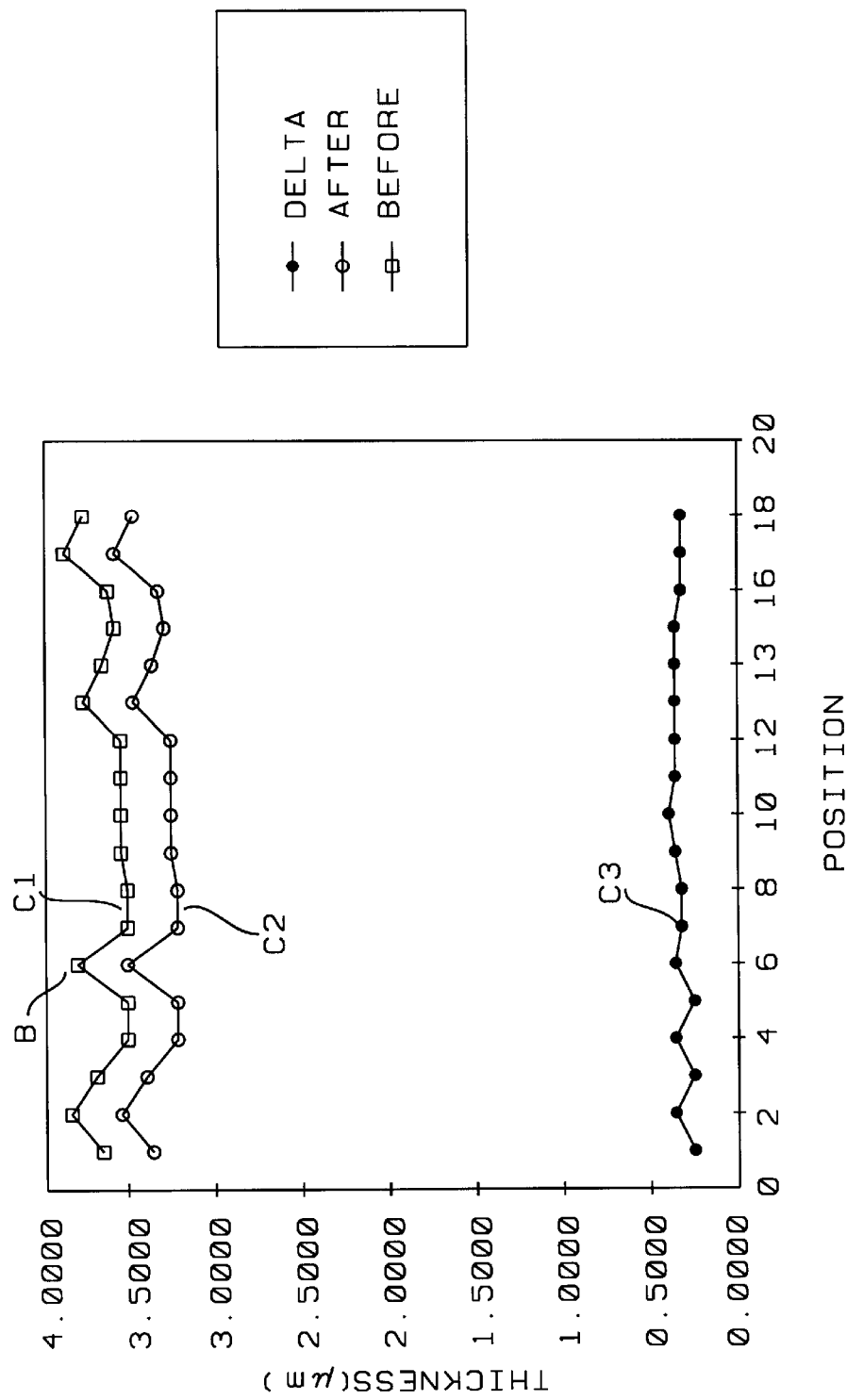
FIG. 11 shows the thickness profile of a wafer before and after planarization using a double pad.

FIG. 11 shows the thickness of structures on a wafer before planarizing (line C1) and after planarizing (line C2) and the difference in thicknesses (line C3). The Y axis is in microns, and the X axis is various die positions (i.e. the positions of various read-write elements) on the wafer. The wafer includes localized bumps, e.g. labelled B. A double pad can properly planarize read-write elements at local bump B without grinding t h ose elements away.

Figure 3I:
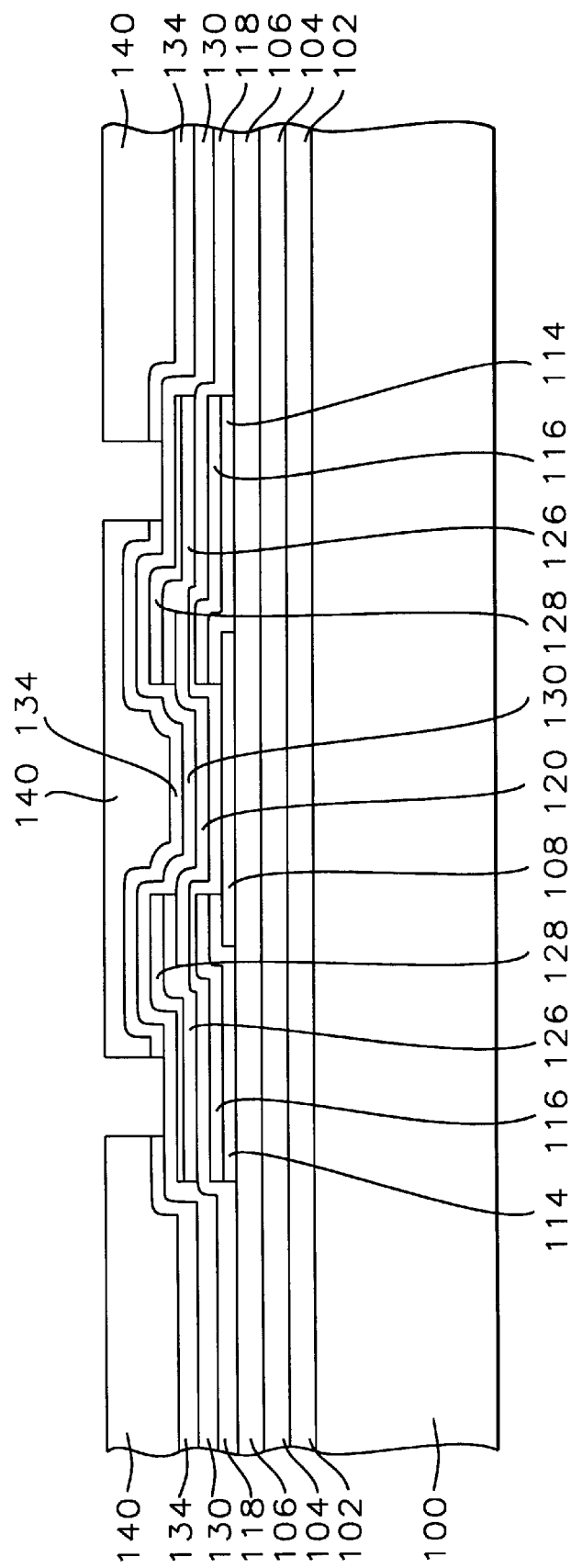
Figure 3J:
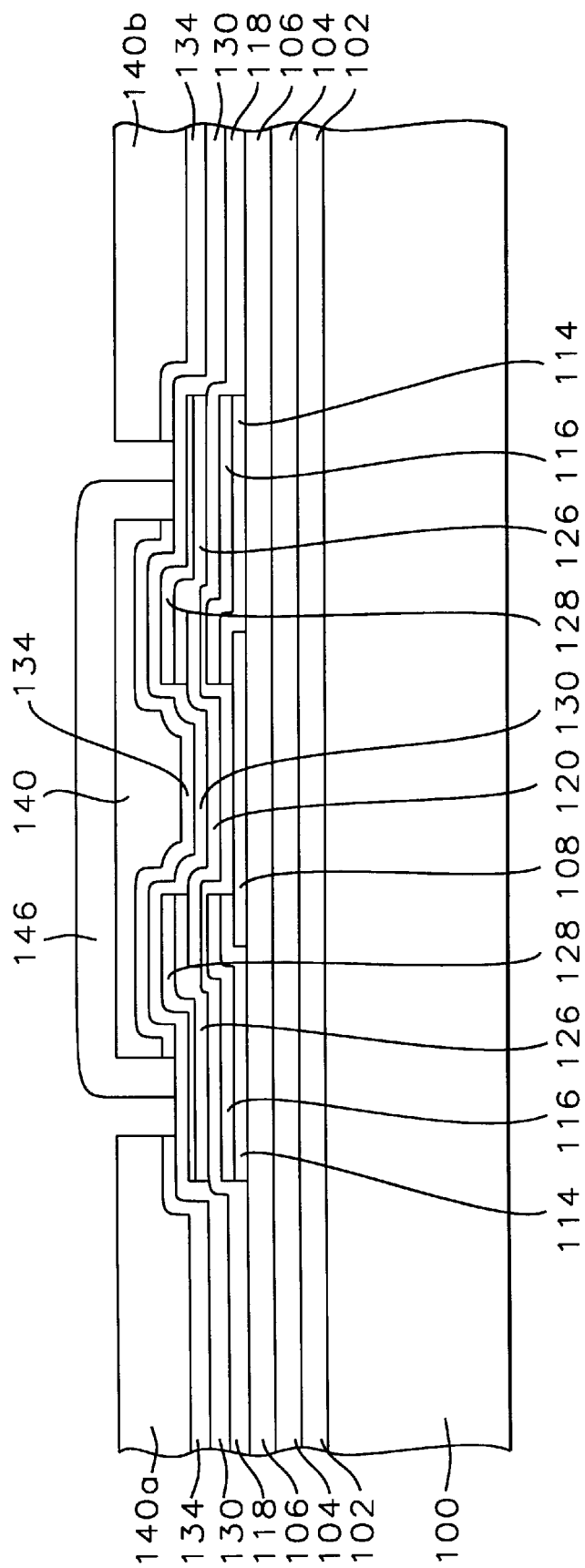

Referring to FIG. 3i, photoresist layer 138 is then removed using conventional photoresist stripping solution. In addition, seed layer 134 under photoresist 138 is removed by ion beam etching. Thereafter, a photoresist layer 146 is applied to the wafer (FIG. 3j) and then patterned to protect the active area of the magnetoresistive element. Thereafter, portions 140a, 140b of NiFe layer 140 are removed, e.g. by a wet etching process using DI water, $H_2O_2$ and $H_2SO_4$.

As mentioned above, at the conclusion of this part of the process, the top surface of shared pole layer 140 is a planar surface upon which the writing element is formed. This planar surface provides a key advantage to our invention, i.e. the gap in the write structure will not be curved. This permits improved recording density.

Figure 3K:
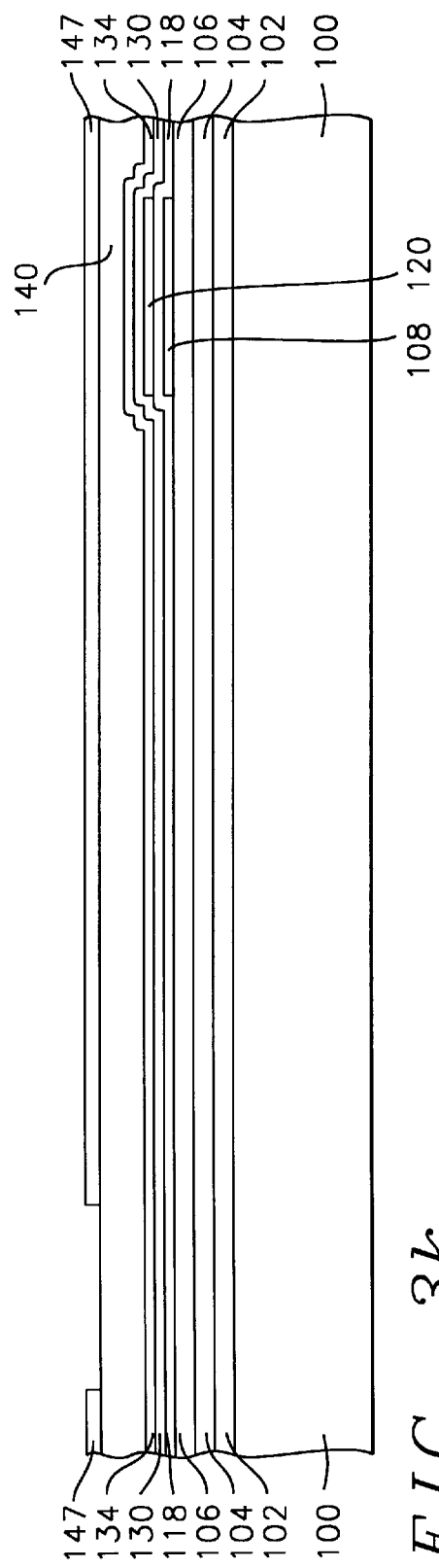
FIGS. 3k to 3m illustrate in cross section the read-write element of FIGS. 3a to 3j along the same direction as arrows B—B in FIG. 1.
Figure 3L:
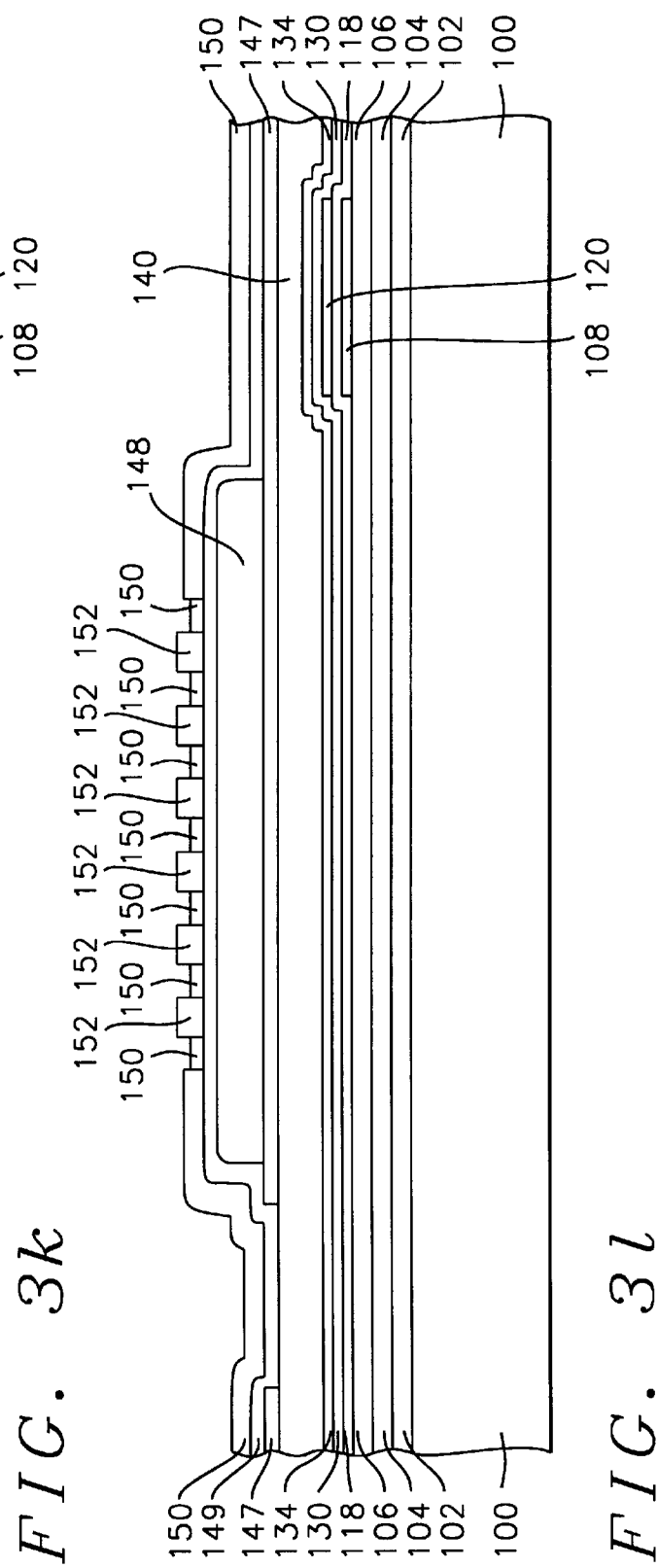

The read write element is completed. An insulating layer 147, such as $Al_2O_3$ (about 0.3 microns thick), is sputtered onto the wafer and then patterned (FIG. 3k). Thereafter, a layer of photoresist 148 is deposited on the wafer (FIG. 3l), patterned and cured where the write element coil is to be formed. Photoresist 148 can be about 3.5 $\mu$m thick. A 100 to 700 Å thick seed layer 149 (typically comprising a Ti sublayer followed by a Cu sublayer) is formed on the wafer, e.g. by sputtering. A photoresist layer 150 is then deposited on the wafer and patterned to define where the coil is to be formed.

Thereafter, a Cu coil layer 152 is electroplated onto the wafer to a thickness of about 3.1 microns. Of importance, Cu is only deposited in the area where photoresist layer 150 has been stripped away (i.e. where seed layer 149 is exposed). Photoresist layer 150 is then completely removed, and the portion of seed layer 149 under photoresist layer 150 is removed by ion beam etching.

Figure 3M:
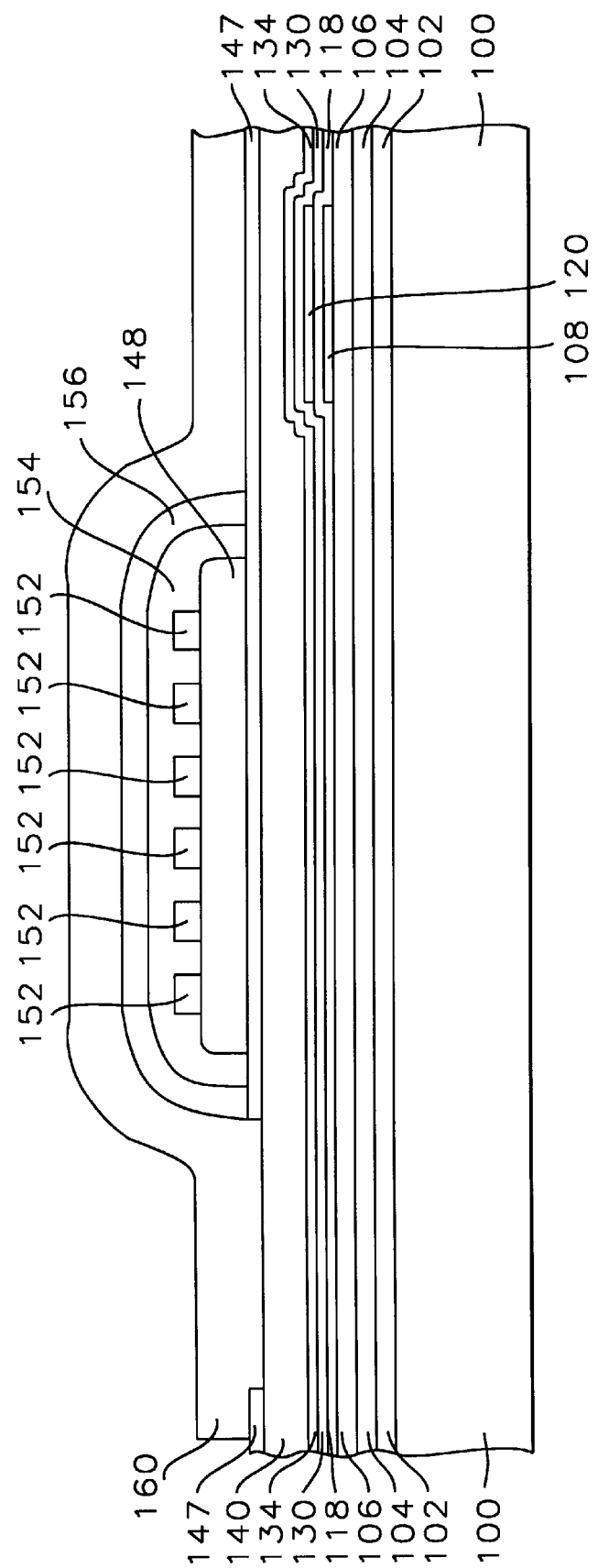

Referring to FIG. 3m, the wafer is then coated with a photoresist layer 154 which is patterned and cured. Another photoresist layer 156 is formed on the wafer, patterned and cured. These photoresist layers are about 5 microns thick.

Thereafter a top pole seed layer (typically NiFe, including 81% Ni and 19% Fe) is deposited on the wafer by sputtering, e.g. to a thickness of about 700 to 1000 Å. The wafer is then coated with photoresist which is then patterned, thereby defining the location of the top pole of the write element. Thereafter NiFe (again about 81% Ni, 19% Fe) layer 160 is deposited on the wafer by electroplating, to a thickness of about 4 microns. The photoresist and the portion the seed layer formed thereunder are removed. The resulting structure is a complete magnetoresistive read-write element. Top pole layer 160 and shared pole layer 140 form the magnetic poles of the write element. Coil layer 152 serves as an electrical coil for generating magnetic flux. Layer 147 is the gap between magnetic poles 140 and 160. Magneto-resistive stripes 108 and 120 form the read element. Bottom and shared pole layers 104, 140 serve as shields for filtering the magnetic field from adjacent data tracks.

The wafer is then cut and formed into individual read-write heads in a conventional manner. A read-write head in which the shared pole layer is planarized is shown in FIG. 1 of Y. Hsu, et al., "Dual-Stripe MR Heads for One Gigabit per Inch Square Recording Density", IEEE Digests of Intermag 1995. Hsu is incorporated herein by reference.

Alternative Embodiment Using An Etch-Back Technique

Figure 5A:
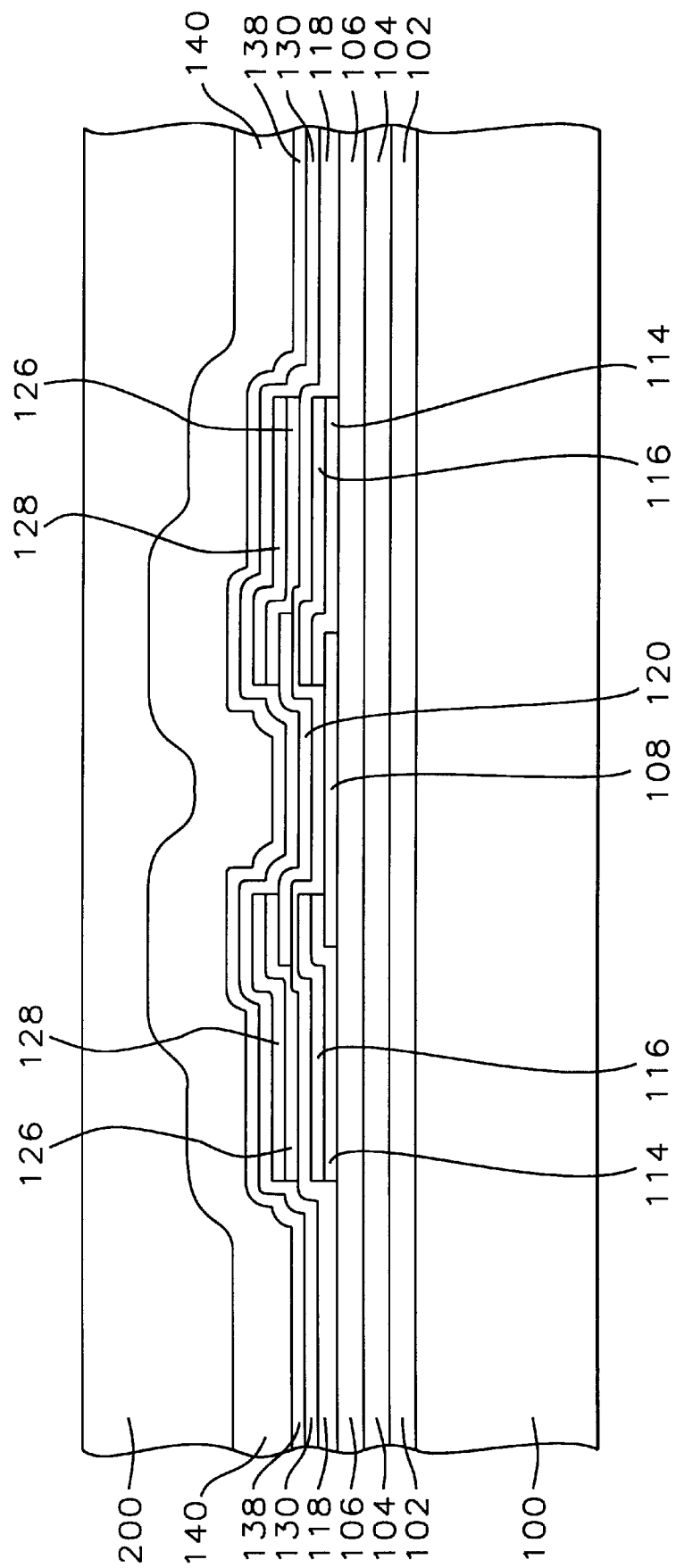
FIGS. 5a to 5c illustrate in cross section a read-write element during a manufacturing process in accordance with another embodiment of our invention.

In accordance with another embodiment of our invention, instead of using the chemical-mechanical planarizing technique discussed above, an etch-back technique is used to form a planarized read write head element. FIG. 5*a* illustrates the magnetoresistive read write head after shared pole layer 140 is formed. However, in accordance with this alternative embodiment of our invention, a polymer layer 200 is deposited on the wafer. Polymer layer 200 may be photoresist, e.g. photoresist type AZ P4620, available from Hoechst Celanese Corporation of Summerville, N.J. Alternatively, Nano PMGI SF9 photoresist from Microlithography Chemical Corp. of Newton, Mass. can be used. However, in other embodiments, layer 200 may be other photoresist materials or non-photoresist materials such as "spin on glass" material.

One can ensure that the top surface of layer 200 is planar by appropriately adjusting the spin velocity and resist viscosity in a manner known in the art.

Figure 5B:
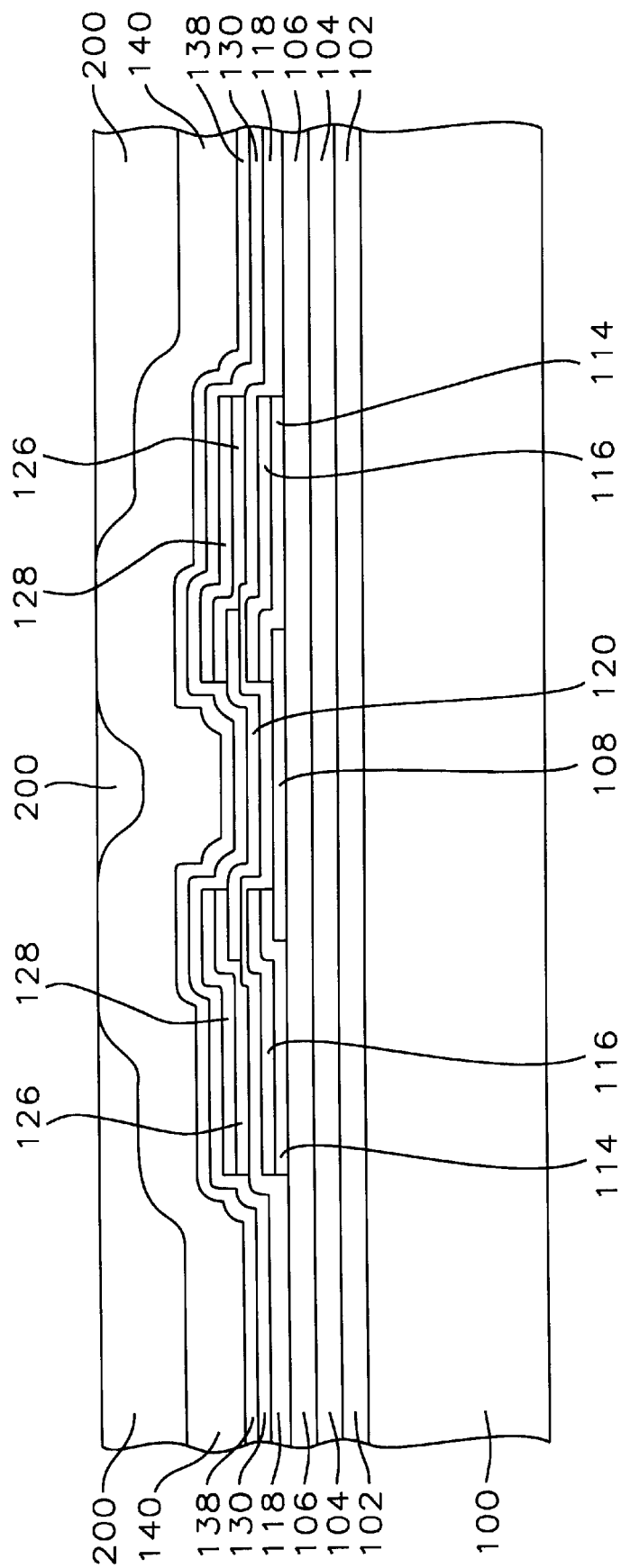
Figure 5C:
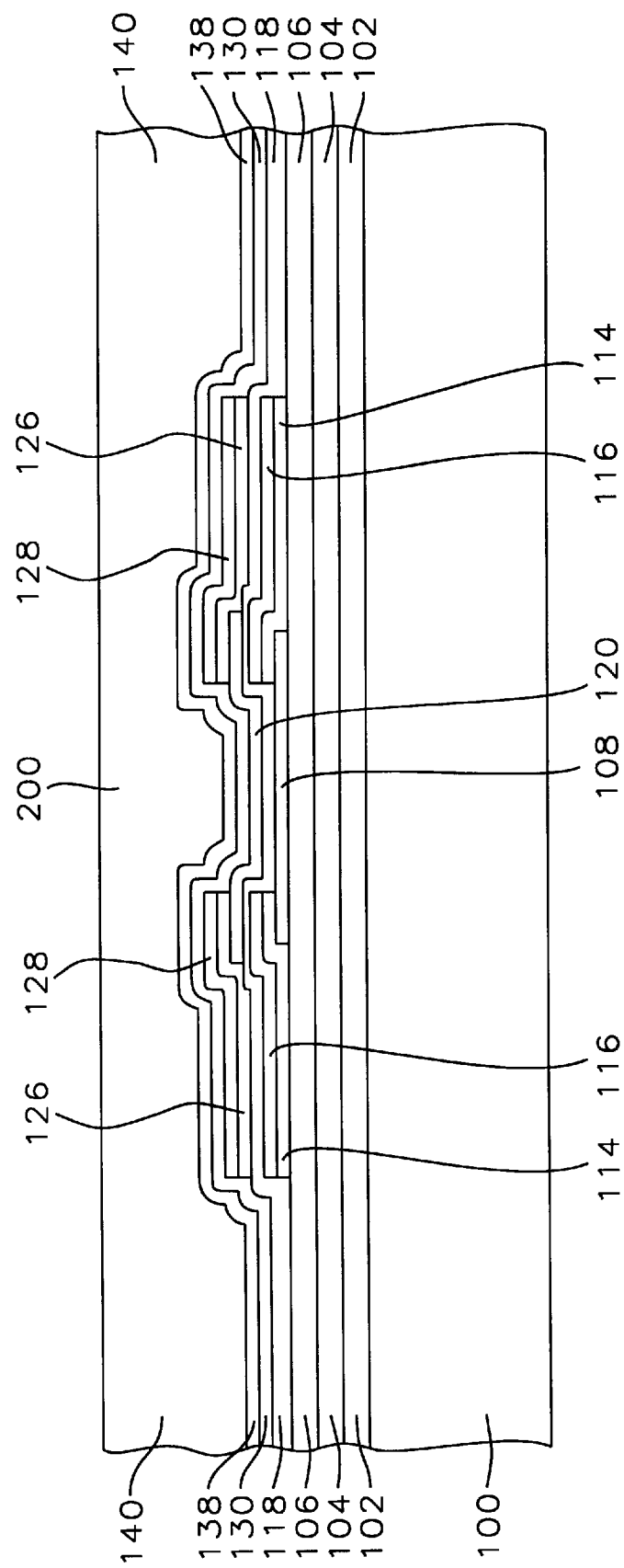

Thereafter the wafer is subjected to an etching step such as an ion beam etching step in which polymer layer 200 is etched. Referring to FIG. 5*b*, eventually, shared pole layer 140 is exposed during this ion beam etching step. As the ion beam process continues, the shared pole material is etched at the same rate as polymer layer 200. The ion beam etching parameters such as ion beam angle, power and process gas are selected in a known manner to ensure that polymer layer 200 and shared pole layer 140 etch at the same rate. For example, in one embodiment, an ion beam etch angle between 25 and 45°, an ion beam voltage of about 600 V, an ion beam current of about 400 mA are used. The process gas is argon with a flow rate of 10 SCCM. However, other parameters can be used as well. Accordingly, as polymer layer 200 and shared pole layer 140 are etched, the resulting wafer continues to have a planar topology. Eventually, the polymer layer 200 on top of shared pole layer 200 is removed, thereby leaving the structure shown in FIG. 5*c*. Any residual portion of polymer layer 200 elsewhere on the wafer is stripped away, and the read-write element is then completed as discussed above in relation to FIG. 3.

While the above-described version of this embodiment uses ion beam etching, other techniques such as reactive ion etching can be used.

Planarizing Technique In Which a Planar Layer is Provided On Top of the Shared Pole In another embodiment, instead of planarizing shared pole 140, a material, e.g. photoresist or other polymer, is deposited on top of shared pole 140 such that it has a planar top surface (similar to the profile shown in FIG. 5*a*). This can be accomplished by a "spinning on" process. The remaining portions of the read-write element are formed thereon without etching back the photoresist. In this embodiment, the photoresist (or other polymer) should be formed to have a thickness appropriate for the gap of the write element.

While the invention has been described with respect to specific details, those skilled in the art will recognize that changes can be made in form and detail without departing from the spirit and scope of the invention. For example, while the methods disclosed above provide structures including two magnetoresistive stripes, other embodiments of our invention use only one magnetoresistive stripe. Further, while the above methods involve extensive use of sputtering, other deposition techniques may be used. Also, although the above methods involve electroplating, techniques other than electroplating may be used to deposit the pole and coil layers. In addition, instead of using photolithography to pattern the various structures, other patterning techniques, e.g. such as e-beam patterning can be used. In lieu of photoresist, other materials such as spin-on-glass may be used.

Our invention is not limited to the specific materials and compositions set forth above. For example, while the above described methods use an $Al_2O_3$—TiC substrate, other materials (e.g. a ceramic material such as SiC) can be used. $SiO_2$ or other insulating materials can be used in lieu of the $Al_2O_3$ insulating material. CoNiFe or other materials can be used in lieu of the NiFe magnetoresistive alloy. Pole layers 104, 140 and 160 can be sputtered or plated high magnetic moment materials instead of NiFe. Exchange layers 114, 126 can be FeMn or permanent magnet materials and the conductor layers 116, 128 can be made of refractory metals such as Ti or W or other conductive materials.

Also, instead of using ion beam etching, e.g. to remove seed layers, other etching techniques can be used such as sputter etching.

Accordingly, all such changes come within the scope of our invention.

We claim:

1. A method for forming a magnetic pole layer comprising:

providing a substrate;

forming over the substrate a photoresist frame employed within a photoresist frame plating method for forming a photoresist frame plated lower magnetic pole layer formed within the photoresist frame and over the substrate;

forming, while employing the photoresist frame plating method, the photoresist frame plated lower magnetic pole layer within the photoresist frame;

planarizing simultaneously, while employing a planarizing method, the photoresist frame and the photoresist frame plated lower magnetic pole layer to form a corresponding planarized photoresist frame and a corresponding planarized photoresist frame plated patterned lower magnetic pole layer.

2. The method of claim 1 further comprising:

forming upon the planarized photoresist frame plated patterned lower magnetic pole layer a gap filling layer; and forming upon the gap filling layer an upper magnetic pole layer, wherein the gap filling layer is formed substantially planar.

3. The method of claim 2 wherein the planarized photoresist frame is stripped from over the substrate prior to forming upon the planarized photoresist frame plated patterned lower magnetic pole layer the gap filling layer.

4. The method of claim 1 wherein by planarizing the photoresist frame plated lower magnetic pole layer simultaneously with the photoresist frame, there is avoided erosion at a pair of upper corners of the planarized photoresist frame plated patterned lower magnetic pole layer.

5. The method of claim 1 wherein the planarizing method is selected from the group of planarizing methods consisting of a chemical mechanical polish planarizing method and a reactive ion etch etchback planarizing method.

6. The method of claim 5 wherein the chemical mechanical polish planarizing method employs:
   an alkali chemical mechanical polish planarizing slurry composition; and
   a chemical mechanical polish planarizing pad comprising:
      a comparatively hard layer contacting the photoresist frame plated lower magnetic pole layer and the photoresist frame; and
      a comparatively soft layer laminated to the side of the comparatively hard layer opposite the side of the comparatively hard layer contacting the photoresist frame plated lower magnetic pole layer and the photoresist frame.

7. The method of claim 6 wherein by employing the chemical mechanical polish planarizing pad comprising the comparatively hard layer laminated to the comparatively soft layer there is provided a uniform planarizing of a second photoresist frame plated lower magnetic pole layer formed within a separate portion of the photoresist frame when simultaneously planarizing the photoresist frame plated lower magnetic pole layer and the second photoresist frame plated lower magnetic pole layer while employing the chemical mechanical polish planarizing method.

8. The method of claim 1 wherein the photoresist frame covers a test structure formed over the substrate when planarizing the photoresist frame and the photoresist frame plated lower magnetic pole layer to form the planarized photoresist frame and the planarized photoresist frame plated patterned lower magnetic pole layer.

9. The method of claim 1 wherein:
   the planarized photoresist frame plated patterned lower magnetic pole layer is employed within a magnetoresistive read write head; and
   the planarized photoresist frame plated patterned lower magnetic pole layer is employed as a shared pole layer within the magnetoresistive read write head.

10. A method for forming a magnetic pole layer comprising:
    providing a substrate;
    forming over the substrate a magnetoresistive layer;
    forming over the magnetoresistive layer a photoresist frame employed within a photoresist frame plating method for forming a photoresist frame plated lower magnetic pole layer formed within the photoresist frame and over the magnetoresistive layer;
    forming, while employing the photoresist frame plating method, the photoresist frame plated lower magnetic pole layer within the photoresist frame;
    planarizing simultaneously, while employing a planarizing method, the photoresist frame and the photoresist frame plated lower magnetic pole layer to form a corresponding planarized photoresist frame and a corresponding planarized photoresist frame plated patterned lower magnetic pole layer.

11. The method of claim 10 further comprising:
    forming upon the planarized photoresist frame plated patterned lower magnetic pole layer a gap filling layer; and
    forming upon the gap filling layer an upper magnetic pole layer, wherein the gap filling layer is formed substantially planar.

12. The method of claim 11 wherein the planarized photoresist frame is stripped from over the magnetoresistive layer prior to forming upon the planarized photoresist frame plated patterned lower magnetic pole layer the gap filling layer.

13. The method of claim 10 wherein by planarizing the photoresist frame plated lower magnetic pole layer simultaneously with the photoresist frame, there is avoided erosion at a pair of upper corners of the planarized photoresist frame plated patterned lower magnetic pole layer.

14. The method of claim 10 wherein the planarizing method is selected from the group of planarizing methods consisting of a chemical mechanical polish planarizing method and a reactive ion etch etchback planarizing method.

15. The method of claim 14 wherein the chemical mechanical polish planarizing method employs:
    an alkali chemical mechanical polish planarizing slurry composition; and
    a chemical mechanical polish planarizing pad comprising:
       a comparatively hard layer contacting the photoresist frame plated lower magnetic pole layer and the photoresist frame; and
       a comparatively soft layer laminated to the side of the comparatively hard layer opposite the side of the comparatively hard layer contacting the photoresist frame plated lower magnetic pole layer and the photoresist frame.

16. The method of claim 15 wherein by employing the chemical mechanical polish planarizing pad comprising the comparatively hard layer laminated to the comparatively soft layer there is provided a uniform planarizing of a second photoresist frame plated lower magnetic pole layer formed within a separate portion of the photoresist frame when simultaneously planarizing the photoresist frame plated lower magnetic pole layer and the second photoresist frame plated lower magnetic pole layer while employing the chemical mechanical polish planarizing method.

17. The method of claim 10 wherein the photoresist frame covers a test structure formed over the substrate when planarizing the photoresist frame and the photoresist frame plated lower magnetic pole layer to form the planarized photoresist frame and the planarized photoresist frame plated patterned lower magnetic pole layer.

18. The method of claim 10 wherein:
    the planarized photoresist frame plated patterned lower magnetic pole layer is employed within a magnetoresistive read write head selected from the group of magnetoresistive read write heads consisting of single stripe magnetoresistive read write heads and double stripe magnetoresistive read write heads; and
    the planarized photoresist frame plated patterned lower magnetic pole layer is employed as a shared pole layer within the magnetoresistive read write head.

* * * * *